United States Patent
Watanabe et al.

(10) Patent No.: US 12,358,453 B2
(45) Date of Patent: Jul. 15, 2025

(54) AIRBAG DEVICE FOR INSTRUMENT PANEL UPPER SURFACE

(71) Applicant: TOYODA GOSEI CO., LTD., Kiyosu (JP)

(72) Inventors: Shota Watanabe, Kiyosu (JP); Yuya Suzuki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/817,365

(22) Filed: Aug. 28, 2024

(65) Prior Publication Data

US 2025/0100495 A1   Mar. 27, 2025

(30) Foreign Application Priority Data

Sep. 26, 2023   (JP) .................................. 2023-163740

(51) Int. Cl.
  *B60R 21/205*   (2011.01)
  *B60R 21/2338*   (2011.01)

(52) U.S. Cl.
  CPC ........ *B60R 21/205* (2013.01); *B60R 21/2338* (2013.01); *B60R 2021/23386* (2013.01)

(58) Field of Classification Search
  CPC .............. B60R 21/205; B60R 21/2338; B60R 2021/23386
  See application file for complete search history.

(56) References Cited

U.S. PATENT DOCUMENTS

| | | | | |
|---|---|---|---|---|
| 5,306,043 A | * | 4/1994 | Mihm | B60R 21/2338 280/743.2 |
| 6,846,008 B2 | * | 1/2005 | Kamiji | B60R 21/231 280/729 |
| 7,455,317 B2 | * | 11/2008 | Bito | B60R 21/233 280/743.1 |
| 7,695,012 B2 | * | 4/2010 | Libby | B60R 21/233 280/743.1 |
| 7,731,232 B2 | * | 6/2010 | Higuchi | B60R 21/239 280/739 |
| 9,707,923 B2 | * | 7/2017 | Yamada | B60R 21/205 |

(Continued)

FOREIGN PATENT DOCUMENTS

| | | | |
|---|---|---|---|
| JP | H0999793 A | * | 4/1997 |
| JP | 2007196707 A | * | 8/2007 |

(Continued)

*Primary Examiner* — Laura Freedman
(74) *Attorney, Agent, or Firm* — Posz Law Group, PLC

(57) ABSTRACT

When an airbag is inflated by inflation gas flowing into the airbag, the airbag is inflated rearward while protruding upward from a storage portion on an upper surface side of an instrument panel. The airbag includes a bag main body and an outer tether portion disposed on an outer peripheral surface side of the bag main body. The bag main body has an upward recessed portion on a lower surface side of the front side with respect to an occupant side wall portion disposed on a rear surface side of the completely inflated bag main body. The outer tether portion is provided to connect a rear lower end side of the completely inflated bag main body and a front edge side of the recessed portion so that the rear lower end of the completely inflated bag main body can be disposed close to a rear surface of the instrument panel.

4 Claims, 13 Drawing Sheets

(56) References Cited

U.S. PATENT DOCUMENTS

| | | | | |
|---|---|---|---|---|
| 9,821,750 B2* | 11/2017 | Miura | ................... | B60R 21/233 |
| 10,328,884 B2* | 6/2019 | Kobayashi | ............ | B60R 21/231 |
| 10,351,090 B2* | 7/2019 | Yamada | ................ | B60R 21/233 |
| 10,507,783 B2* | 12/2019 | Rupp | ................... | B60R 21/239 |
| 11,370,381 B1* | 6/2022 | Mihm | ................... | B60R 21/205 |
| 11,529,922 B2* | 12/2022 | Mihm | ................... | B60K 37/20 |
| 2016/0082916 A1 | 3/2016 | Miura et al. | | |
| 2023/0391286 A1* | 12/2023 | Chavez | ................ | B60R 21/231 |

FOREIGN PATENT DOCUMENTS

| | | |
|---|---|---|
| JP | 2008-044479 A | 2/2008 |
| JP | 2016-060390 A | 4/2016 |

\* cited by examiner

AIRBAG DEVICE FOR INSTRUMENT PANEL UPPER SURFACE

CROSS REFERENCE TO RERATED APPLICATION

The present application claims priority from Japanese Patent Application No. 2023-163740 of Watanabe et al., filed on Sep. 26, 2023, the entire disclosures of which are incorporated herein by reference.

BACKGROUND

1. Technical Field

The present disclosure relates to an airbag device including: an airbag that is disposed on an upper surface side of an instrument panel and can inflate by allowing inflation gas to flow into the airbag; an inflator that supplies the inflation gas to the airbag; and a storage portion that stores the folded airbag and the inflator.

2. Description of Related Art

Conventionally, as an airbag device having such a configuration, there has been an airbag device configured as described in JP 2016-60390 A. A conventional airbag device is provided in front of a passenger seat in order to protect an occupant seated on the passenger seat. In the airbag device for a passenger seat having such a configuration, when the inflator is activated, the airbag folded and stored in the storage portion is unfolded and inflated rearward while protruding upward from the storage portion, thereby protecting the occupant seated on the passenger seat. In detail, a front surface side of the inflated airbag is supported by the instrument panel and a windshield disposed above the instrument panel, thereby receiving and protecting the occupant moving forward.

However, in a case where an airbag device having such a configuration is mounted on, for example, a vehicle of a type in which an instrument panel is disposed at a position largely spaced forward from a front seat on which an occupant is seated, the volume of the airbag needs to be larger to stably receive the occupant, thereby leading to an increase in size of the device and an increase in manufacturing cost. This is because the distance from the mounting position of the airbag device to the occupant is large.

SUMMARY

An airbag device of the present disclosure has the following configuration:
the airbag device is disposed on an upper surface side of an instrument panel, and the airbag device includes:
an airbag configured to inflate by allowing inflation gas to flow into the airbag;
an inflator that supplies the inflation gas to the airbag; and
a storage portion that stores the airbag that is folded and the inflator,
the airbag being configured to be unfolded and inflated rearward while protruding upward from the storage portion when the airbag inflates by allowing the inflation gas discharged from the inflator to flow into the airbag,
wherein
the airbag includes:
a bag main body that inflates by allowing the inflation gas to flow into the bag main body; and
an outer tether portion that is disposed on an outer peripheral surface side of the bag main body and regulates a completely inflated shape of the bag main body, and
the bag main body includes:
an occupant side wall portion that is provided on a rear surface side of the bag main body when the bag main body is completely inflated and that is configured to protect an occupant seated on a front seat; and
a recessed portion that is recessed upward so as to provide a gap between the bag main body and the instrument panel, on a lower surface side of a region on a front side with respect to the occupant side wall portion when the bag main body is completely inflated, and
the outer tether portion is provided so as to connect a rear lower end side of the bag main body and a front edge side of the recessed portion when the bag main body is completely inflated, such that a rear lower end of the bag main body when the bag main body is completely inflated is disposed close to a rear surface of the instrument panel.

DETAILED DESCRIPTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
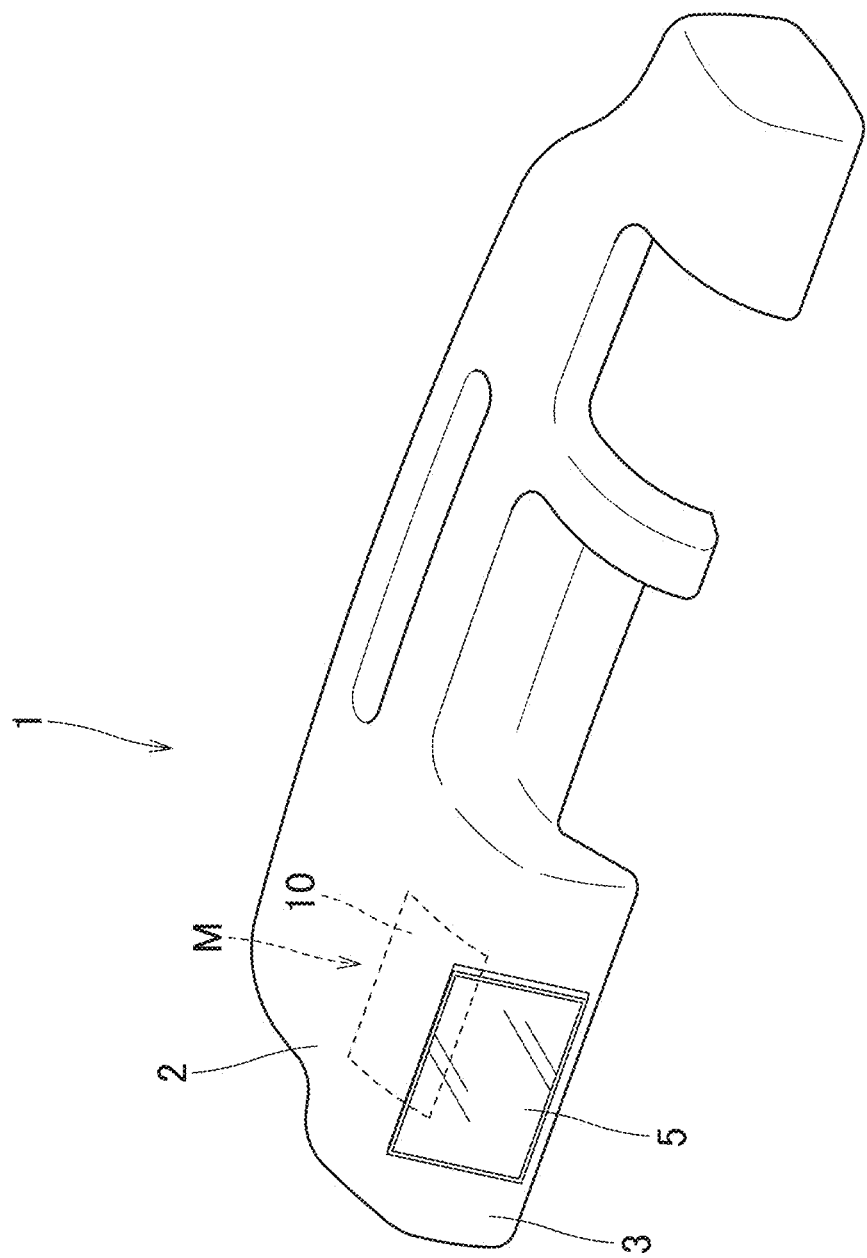
FIG. 1 is a schematic perspective view illustrating an instrument panel of a vehicle on which an airbag device for a passenger seat according to an embodiment of the present disclosure is mounted.
Figure 2:
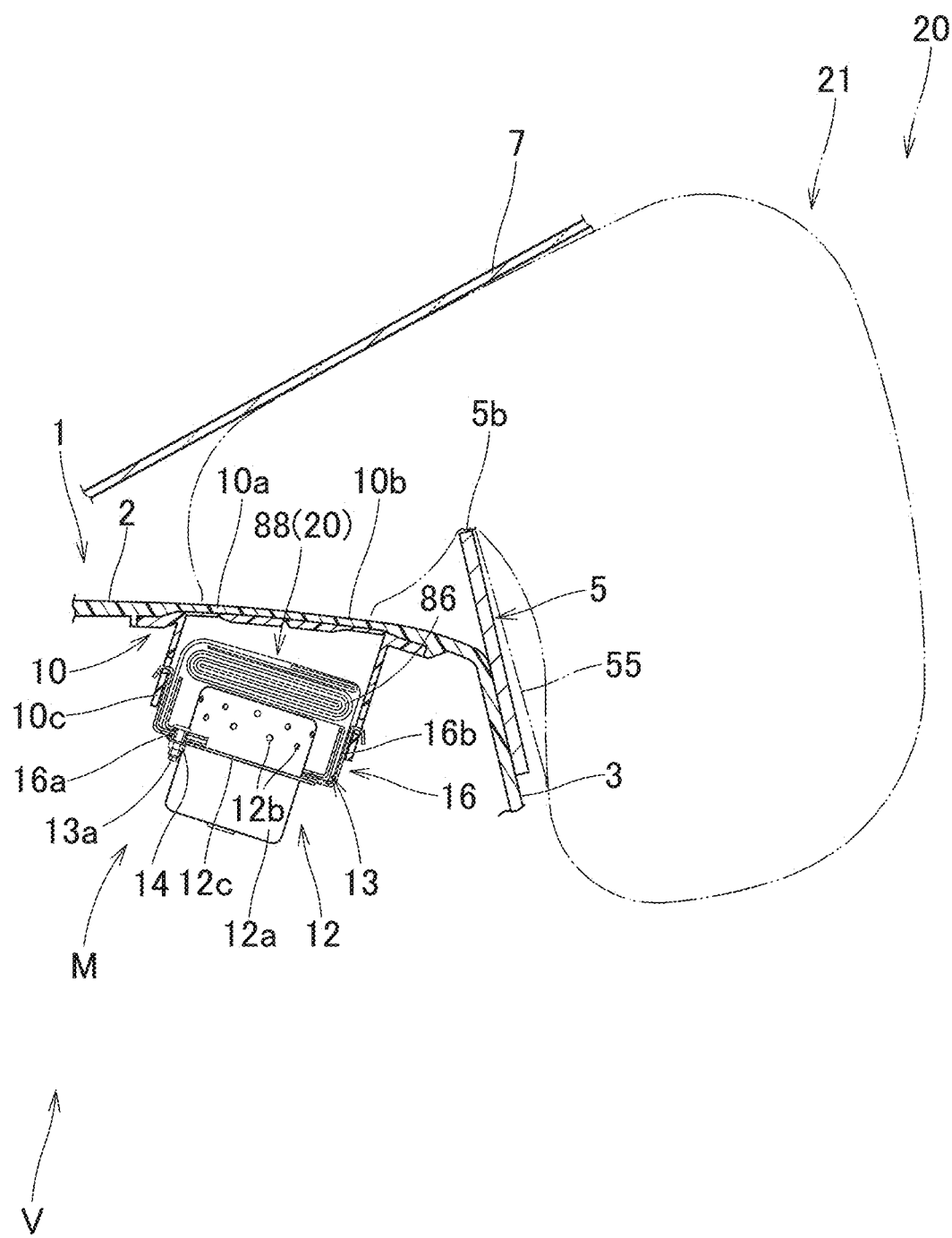
FIG. 2 is a schematic vertical sectional view of a state where the airbag device for a passenger seat of the embodiment is mounted on a vehicle.

Hereinafter, an embodiment of the present disclosure will be described with reference to the drawings. In the embodiment, an airbag device for a passenger seat (hereinafter, shortened to "airbag device") M disposed in front of a passenger seat as a front seat will be described as an example. As illustrated in FIGS. 1 and 2, the airbag device M is a top-mount type device, which is disposed on an upper surface 2 side of an instrument panel 1. In the embodiment, as illustrated in FIGS. 1 and 2, in the instrument panel 1 of a vehicle V on which the airbag device M is mounted, a monitor 5 as a protruding object is provided on a rear surface side behind a region where the airbag device M is disposed. The monitor 5 is provided so as to partially protrude upward from the instrument panel 1. In detail, in the case of the embodiment, the instrument panel 1 is configured such that a rear surface 3 of the instrument panel 1 is slightly inclined forward with respect to the vertical direction. The monitor 5 is also disposed so as to be slightly inclined forward with respect to the vertical direction and be substantially along the rear surface 3 of the instrument panel 1 (see FIG. 2). In the case of the embodiment, the monitor 5 is formed slightly wider in the left-right direction than the airbag device M (in detail, than an airbag cover 10 to be described later) (see FIG. 1), and is disposed at a position facing an occupant MP seated on the passenger seat (see FIG. 13). Note that, in the embodiment, the front-rear, up-down, and left-right directions respectively coincide with the front-rear, up-down, and left-right directions of the vehicle V unless otherwise specified.

Figure 12:
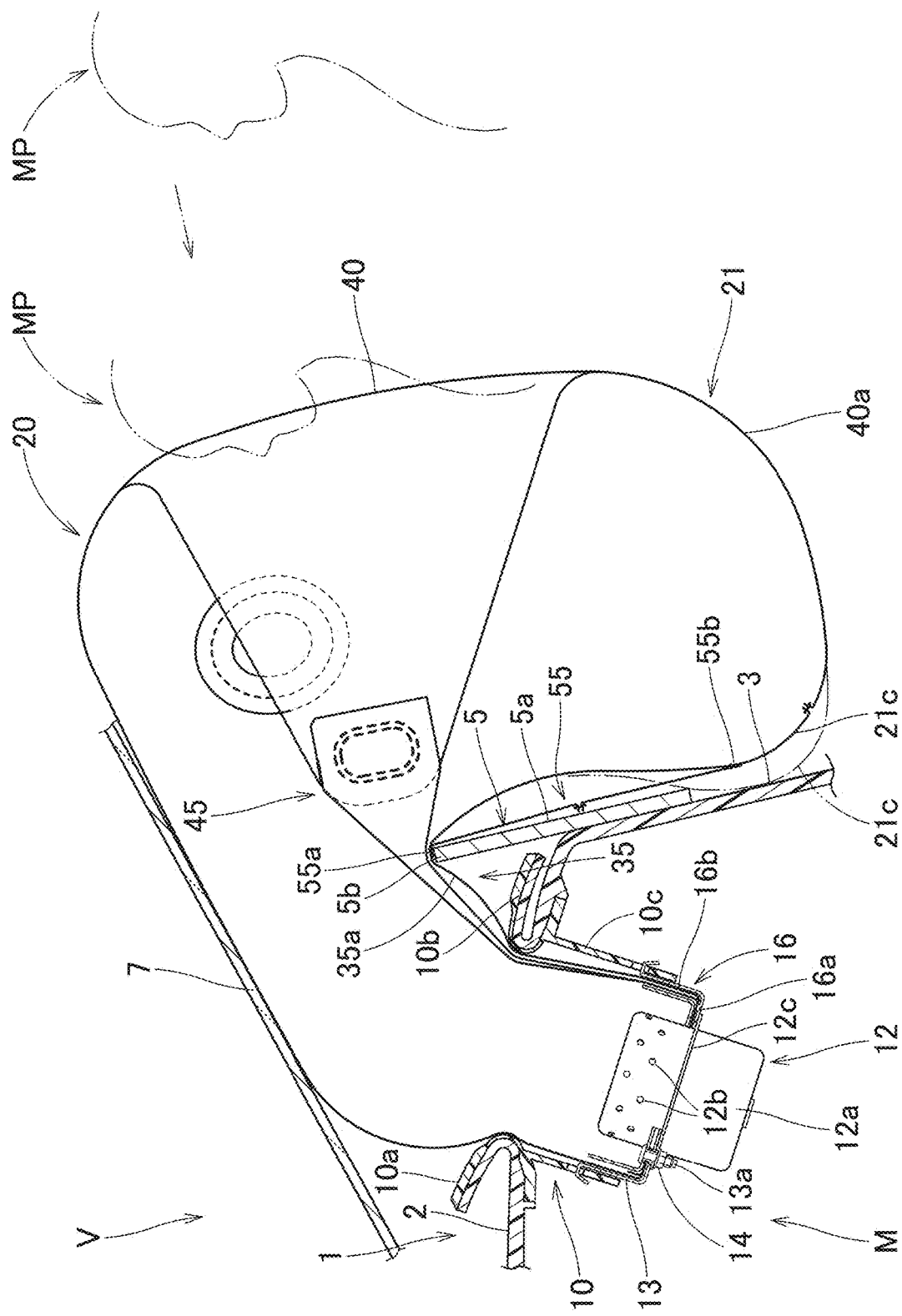
FIG. 12 is a schematic vertical sectional view illustrating, in the airbag device for a passenger seat of the embodiment, a state where the air bag is completely inflated.

As illustrated in FIGS. 2 and 12, the airbag device M includes: an airbag 20 that is folded; an inflator 12 that supplies inflation gas to the airbag 20; a case 16 serving as a storage portion that stores the folded airbag 20 and the inflator 12; a retainer 13 for attaching the airbag 20 and the inflator 12 to the case 16; and the airbag cover 10 covering the folded airbag 20.

In the case of the embodiment, the airbag cover 10 is formed integrally with the instrument panel 1 made of synthetic resin. The airbag cover 10 includes two front and rear door portions 10a and 10b, and the door portions 10a and 10b are configured to open by being pushed by the airbag 20 when the airbag 20 is unfolded and inflated. Further, a connecting wall portion 10c connected to the case 16 is formed around the door portions 10a and 10b of the airbag cover 10.

As illustrated in FIG. 2, the inflator 12 includes: a main body portion 12a having a substantially columnar shape and having a plurality of gas discharge ports 12b; and a flange portion 12c for attaching the inflator 12 to the case 16.

The case 16 serving as a storage portion is formed in a substantially rectangular parallelepiped shape made of a sheet metal and has a rectangular opening in the upper end side. As illustrated in FIG. 2, the case 16 includes: a bottom wall portion 16a that has a substantially rectangular plate shape and to which the inflator 12 is attached while being inserted through the bottom wall portion 16a from below; and a peripheral wall portion 16b that extends upward from an outer peripheral edge of the bottom wall portion 16a and that locks the connecting wall portion 10c of the airbag cover 10. In the case of the embodiment, the airbag 20 and the inflator 12 are attached to the bottom wall portion 16a of the case 16 using, as attachment means, bolts 13a of the retainer 13 disposed in the airbag 20. At this time, the bolts 13a are fixed with nuts 14 while penetrating a peripheral edge of an inflow opening 30 (to be described later) in the airbag 20, the bottom wall portion 16a of the case 16, and the flange portion 12c of the inflator 12. In addition, a bracket (not illustrated) connected to a body side of the vehicle V is provided on the bottom wall portion 16a of the case 16.

Figure 3:
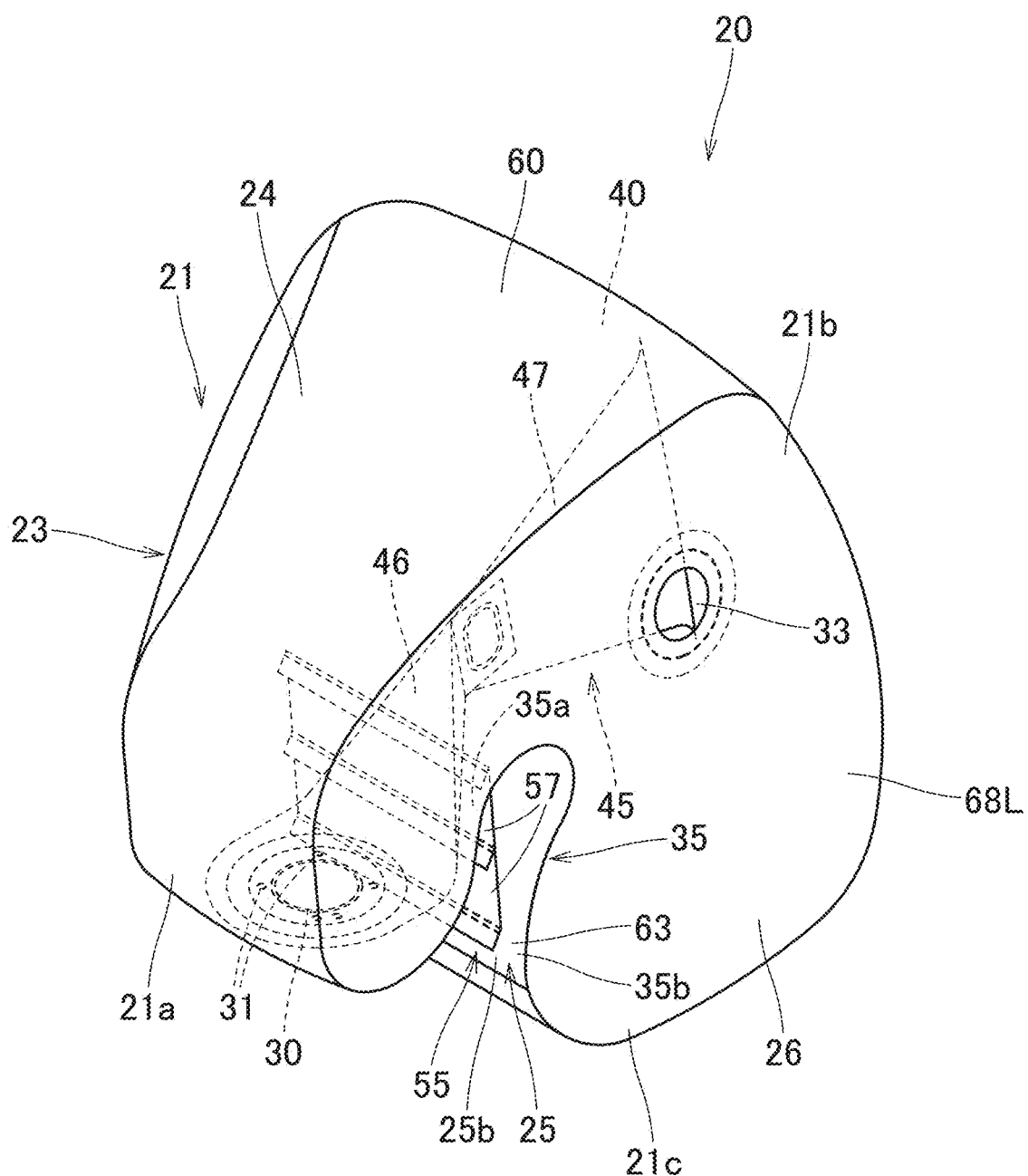
FIG. 3 is a schematic perspective view illustrating a state where an airbag used in the airbag device for a passenger seat of the embodiment is inflated alone.
Figure 4:
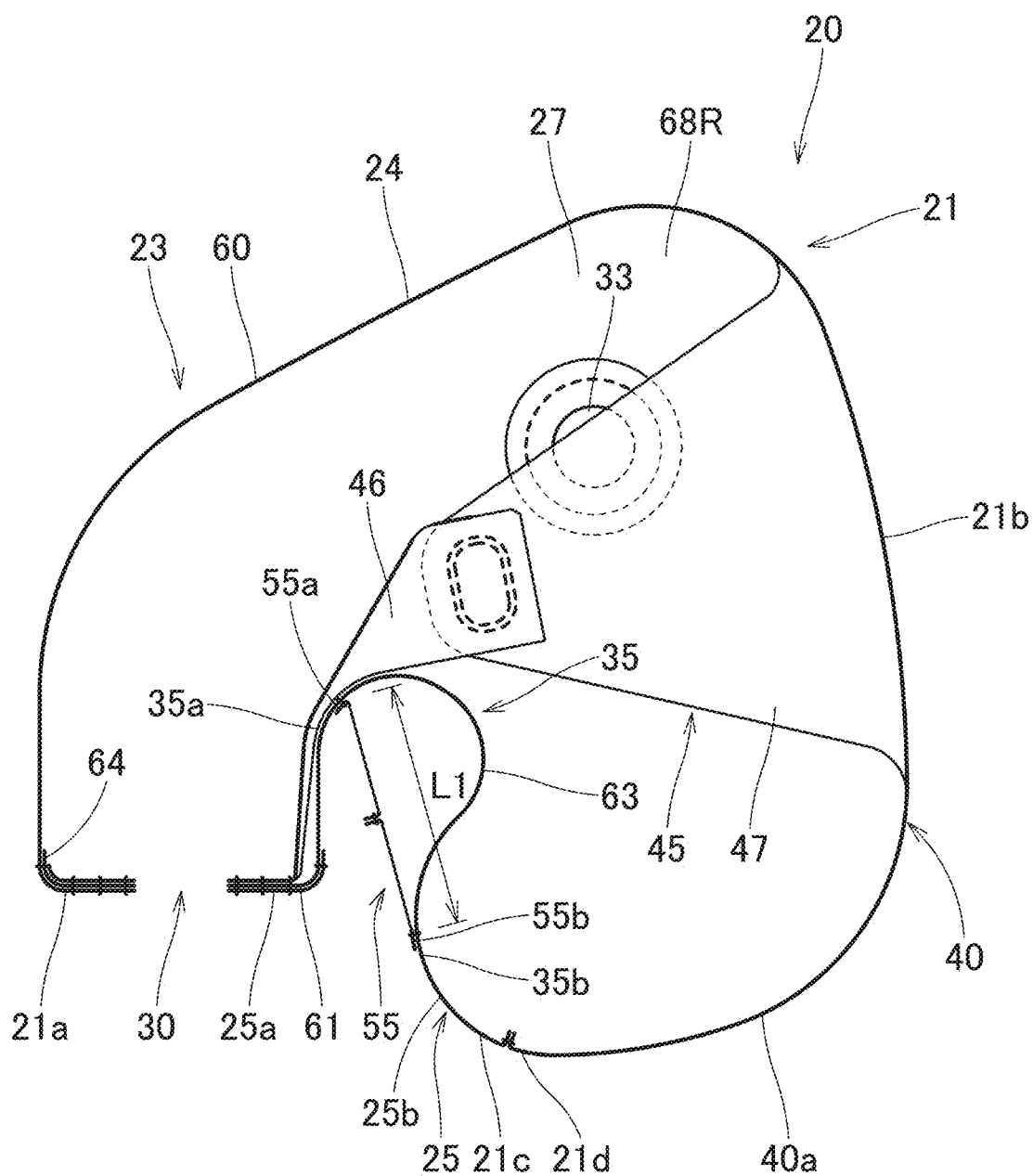
FIG. 4 is a schematic vertical sectional view taken substantially along a front-rear direction of the airbag in FIG. 3.

In the case of the embodiment, as illustrated in FIGS. 3 and 4, the airbag 20 includes: a bag main body 21 that inflates by allowing inflation gas to flow into the bag main body 21; a front-rear tether 45 disposed in the bag main body 21; and an outer tether portion 55 disposed on an outer peripheral surface side of the bag main body 21. The front-rear tether 45 is an inner tether that regulates the completely inflated shape of the bag main body 21. The outer tether portion 55 is a member that regulates the completely inflated shape of the bag main body 21.

As illustrated in FIG. 12, the bag main body 21 is configured to be disposed, when completely inflated, so as to block a space between the upper surface 2 of the instrument panel 1 and the windshield 7 above the instrument panel 1. Specifically, as illustrated in FIGS. 3 and 4, when completely inflated, an outer shape of the bag main body 21 is a substantially quadrangular pyramid shape in which its top portion is disposed on the front end side, and is a shape in which the lower surface side is largely recessed upward. The bag main body 21 includes: an occupant side wall portion 40 disposed on the rear side (rear surface side), which is on the occupant MP side, when completely inflated; and a peripheral wall portion 23 extending from a peripheral edge of the occupant side wall portion 40 and converging toward the front end side. The front end side of the peripheral wall portion 23 is attached to the case 16 side.

The peripheral wall portion 23 is a portion disposed so as to mainly block a space between the upper surface 2 of the instrument panel 1 and the windshield 7 above the instrument panel when the airbag 20 (bag main body 21) is completely inflated. The peripheral wall portion 23 includes: an upper wall portion 24 and a lower wall portion 25 that are disposed to be opposed to each other in the up-down direction; and a left wall portion 26 and a right wall portion 27 disposed so as to be opposed to each other in the left-right direction when the inflation is completed. In the vicinity of a front end 25a of the lower wall portion 25, the inflow opening 30 is formed at a position substantially at the lateral center. The inflow opening 30 is a portion that is opened in a substantially circular shape so that inflation gas can flow inward through the inflow opening 30 and that has a peripheral edge attached to the bottom wall portion 16a of the case 16. A plurality of (four, in the case of the embodiment) attachment holes 31 are formed in a peripheral edge of the inflow opening 30. Each of the attachment holes 31 is a portion through which one of the bolts 13a of the retainer 13 is inserted to attach the peripheral edge of the inflow opening 30 to the bottom wall portion 16a of the case 16. In each of the left wall portion 26 and the right wall portion 27, there is formed a vent hole 33 having a substantially circular shape for discharging an excessive inflation gas having flown into the bag main body 21. The vent holes 33 are respectively provided in the left wall portion 26 and the right wall portion 27 at positions behind and above a region where a recessed portion 35 to be described later is disposed.

In addition, in the bag main body 21 of the embodiment, the lower wall portion 25 is disposed to be curved as viewed in the left-right direction such that the intermediate portion in the front-rear direction is positioned at an upper position. The curved shape of the lower wall portion 25 is provided over substantially the entire area in the left-right direction (that is, substantially the entire area of the bag main body 21 in the left-right direction) (see FIGS. 3 and 4). In the embodiment, due to the curved shape of the lower wall portion 25, the bag main body 21 has a recessed portion 35 that is recessed upward in a lower surface side region of the bag main body 21. In detail, the recessed portion 35 is formed at a position substantially at the center in the front-rear direction when the completely inflated bag main body 21 is viewed from the side in the left-right direction. In other words, the recessed portion 35 is formed on the lower surface side of the region on the front side with reference to the occupant side wall portion 40 such that the recessed portion 35 is separated in the front-rear direction from the occupant side wall portion 40 disposed on the rear surface side of the bag main body 21. As described above, the recessed portion 35 is continuously formed such that the recessed portion 35 has the same recessed shape over the substantially entire area of the bag main body 21 in the left-right direction. That is, by providing the recessed portion 35, the bag main body 21 is provided, when completely inflated, with a gap extending over the entire left-right region between the bag main body 21 and the instrument panel 1. Furthermore, when the airbag 20 is completely inflated, the recessed portion 35 is provided at a position corresponding to the monitor 5 protruding upward on a rear surface 3 side of the instrument panel 1 (see FIG. 12). In other words, the bag main body 21 is provided so as to detour around the monitor 5 by the recessed portion 35 when completely inflated.

Figure 13:
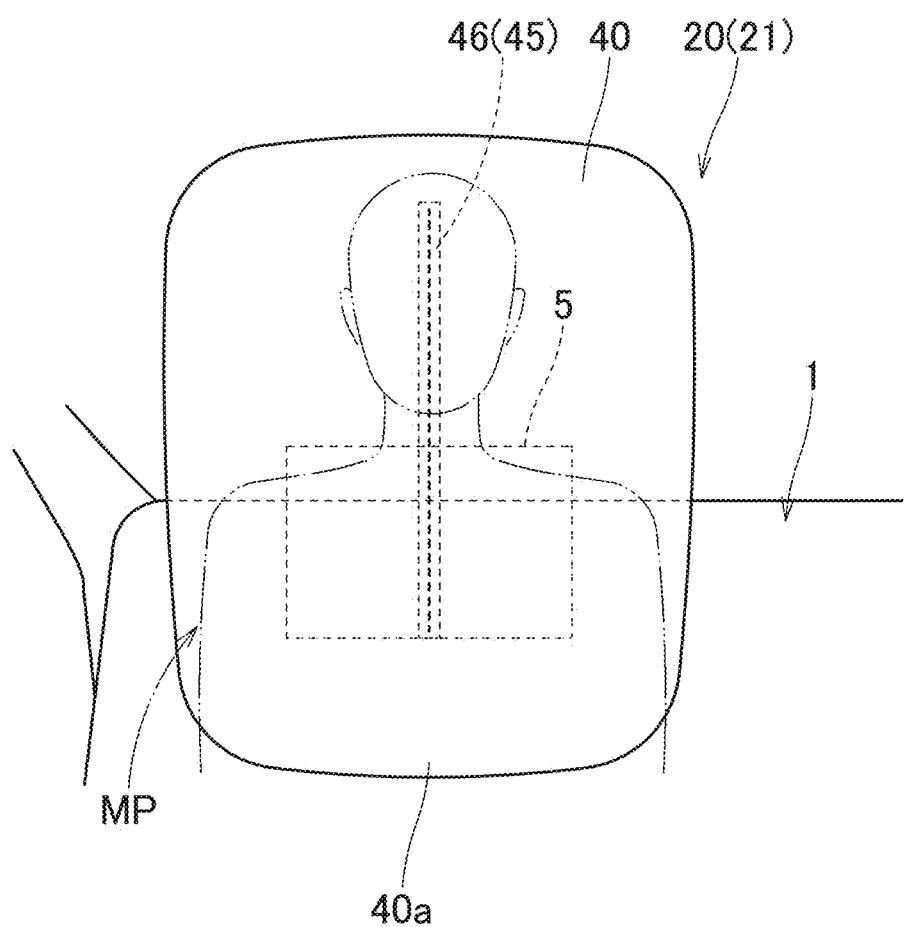
FIG. 13 is a schematic rear view illustrating a state where the airbag is completely inflated as viewed from the rear side of the vehicle in the airbag device for a passenger seat of the embodiment.

When the bag main body 21 is completely inflated, the occupant side wall portion 40 is disposed at a position on a rear end 21b side with respect to the bag main body 21 and in the rear of the monitor 5. Furthermore, the occupant side wall portion 40 is provided substantially along the vertical direction so as to be opposed to the occupant MP seated on the passenger seat when the bag main body 21 is completely inflated (see FIG. 12). Specifically, as illustrated in FIG. 13, the occupant side wall portion 40 is configured to have, when the inflation is completed, an outer shape that is substantially rectangular and is vertically wider such that the occupant side wall portion 40 can widely cover a front part of the upper body of the occupant MP. In the case of the embodiment, the occupant side wall portion 40 is configured to entirely cover the rear side, with respect to the vehicle, of the monitor 5 (see FIGS. 12 and 13). A lower end 40a side of the occupant side wall portion 40 when the inflation is completed is positioned below the monitor 5. The width dimension of the occupant side wall portion 40 in the left-right direction is set to be larger than the width dimension of the monitor 5 in the left-right direction. In the case of the embodiment, an upper surface side (upper wall portion 24 side) of the bag main body 21 is brought into contact with the windshield 7 when the inflation is completed.

Figure 5:
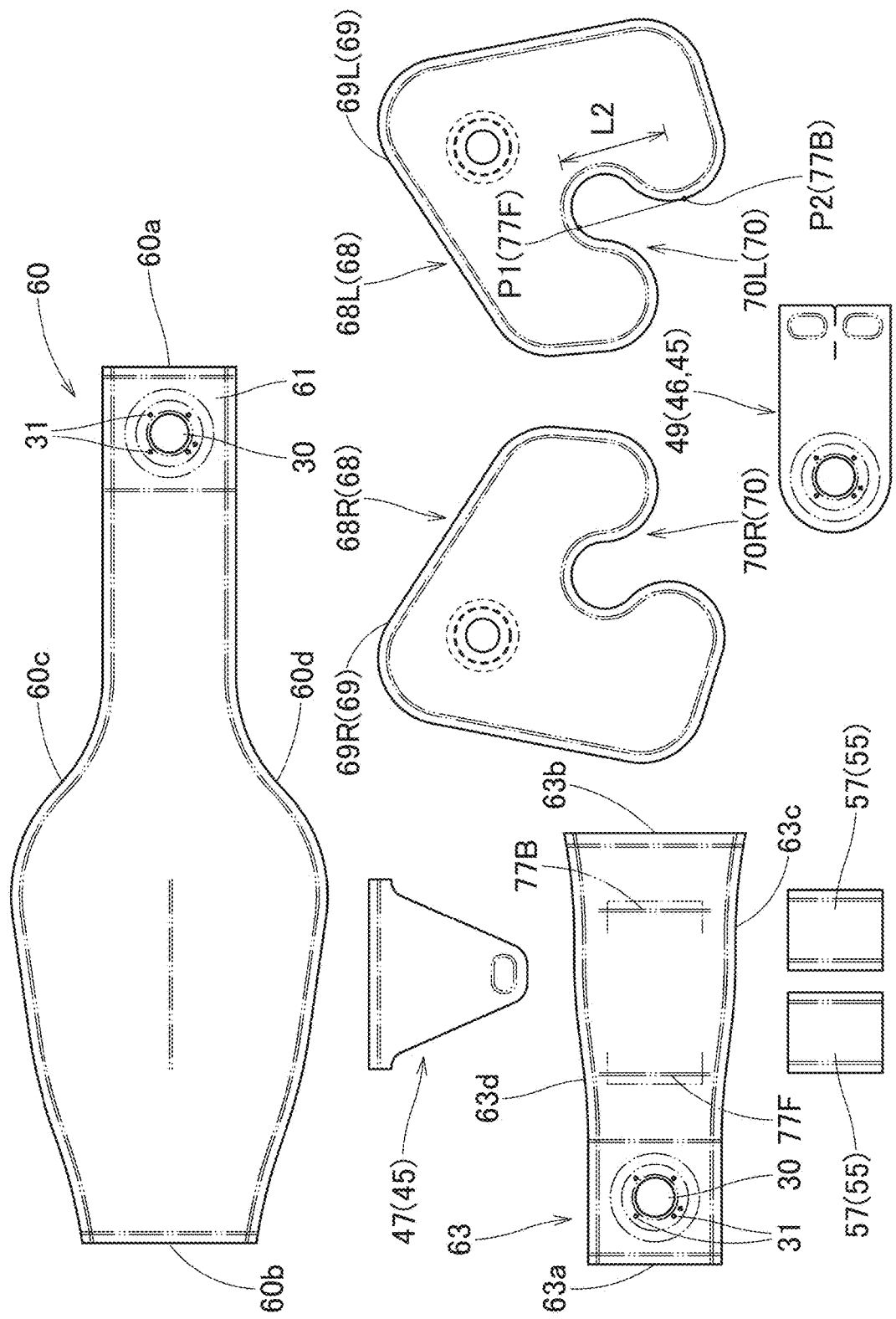
FIG. 5 is a plan view of a state where base materials constituting the airbag in FIG. 3 are arranged.

The front-rear tether 45 as the inner tether disposed in the bag main body 21 is provided so as to connect substantially the center of the occupant side wall portion 40 in the left-right direction and a front end 21a side of the bag main body 21. The front-rear tether 45 is disposed to restrict an excessive rearward projection of the occupant side wall portion 40 in the initial stage of inflation, and to regulate the position of the occupant side wall portion 40 when the inflation is completed (a separation distance between the occupant side wall portion 40 and the portion of the peripheral edge of the inflow opening 30). In the case of the embodiment, the front-rear tether 45 is configured to connect a front-side portion 46 extending from the peripheral edge of the inflow opening 30 and a rear-side portion 47 extending from an occupant side wall portion 40 side (see FIGS. 3 and 4). In the case of the embodiment, the front-side portion 46 is configured such that a strip-shaped front-side portion material 49 illustrated in FIG. 5 is partially two-folded. The rear-side portion 47 has an outer shape that is substantially a trapezoidal shape whose width is narrower toward the front end side connected to the front-side portion 46. The rear-side portion 47 is attached, by sewing, to the occupant side wall portion 40, at a position that is substantially the center of the occupant side wall portion 40 in the left-right direction such that the rear edge of the rear-side portion 47 extends along the up-down direction.

The outer tether portion 55 is provided on the outer peripheral surface side of the bag main body 21 so as to connect a rear lower end 21c side of the completely inflated bag main body 21 (specifically, the vicinity of a rear end 25b of the lower wall portion 25) and a front edge 35a side of the recessed portion 35 (the area on a rear side of the inflow opening 30). In the embodiment, in a state where the airbag 20 (bag main body 21) is inflated alone, the outer tether portion 55 is provided so as to cross the recessed portion 35 as illustrated in FIG. 4. Furthermore, as illustrated in FIG. 12, the outer tether portion 55 is disposed close to a rear surface 5a so as to be substantially along the rear surface 5a on the rear side of the monitor 5 when the inflation is completed in the state where the airbag 20 is mounted on the vehicle. The outer tether portion 55 is for restricting a rear lower end 21c side portion of the bag main body 21 (the lower end 40a side region of the occupant side wall portion 40) from being unfolded and protruding excessively rearward and downward when the bag main body 21 is unfolded and inflated, and is for enabling the rear lower end 21c side portion of the bag main body 21 to be disposed close to the rear surface 3 of the instrument panel 1 when the bag main body 21 is completely inflated. In detail, an upper end 55a (one end), at the time of completion of inflation, of the outer tether portion 55 is connected to the front edge 35a side of the recessed portion 35. In a state where the bag main body 21 mounted on the vehicle is completely inflated, the upper end 55a of the outer tether portion 55 is connected to a portion in the vicinity of an upper end 5b of the monitor 5 (see FIG. 12). The other end (lower end 55b) of the outer tether portion 55 is connected to a position in the vicinity of a rear edge 35b of the recessed portion 35 and above a lower edge 21d of the completely inflated bag main body 21 (in the vicinity of the rear end 25b of the lower wall portion 25) (see FIG. 4). In detail, as illustrated in FIG. 12, in the state where the bag main body 21 mounted on the vehicle is completely inflated, the lower end 55b of the outer tether portion 55 is connected to the bag main body 21, at a position below the monitor 5 and close to the rear surface 3 of the instrument panel 1. A length dimension L1 (see FIG. 4) of the outer tether portion 55 is set to be substantially the same as the following length dimension L2 (see FIG. 5) in a state where side wall panels 68 (68L, 68R), to be described later, constituting the bag main body 21 are unfolded flat. The length dimension L2 is a length dimension L2 of a straight line connecting points P1 and P2 respectively corresponding to connection target portions 77F and 77B (see FIG. 5) to which both ends (the upper end 55a and lower end 55b), on the side wall panels 68 when unfolded flat, of the outer tether portion 55 are connected. Furthermore, the outer tether portion 55 has a width dimension that is substantially equal to a width dimension of the lower wall portion 25. In detail, the width dimension of the outer tether portion 55 is set to be slightly smaller than the width dimension of the lower wall portion 25 (a width dimension of a peripheral wall panel 63 to be described later) (see FIG. 5). As described above, the lower end 55b of the outer tether portion 55 is disposed below the monitor 5 when the bag main body 21 mounted on the vehicle is completely inflated. That is, the outer tether portion 55 widely covers a rear surface 5a side of the monitor 5 over substantially the entire region in the up-down direction and the left-right direction when the bag main body 21 is completely inflated. In the case of the embodiment, as illustrated in FIGS. 3 to 5, the outer tether portion 55 is configured by connecting, in series, two tether base materials 57 and 57.

The bag main body 21 is formed in a bag shape by connecting peripheral edges of base materials (base cloths) having predetermined shapes, to each other. In the case of the embodiment, as illustrated in FIG. 5, the bag main body 21 is configured with two peripheral wall panels 60 and 63 and two side wall panels 68L and 68R.

The peripheral wall panel 60 mainly constitutes the portion from a front end 25a side region of the lower wall portion 25 to the occupant side wall portion 40 through the upper wall portion 24. As illustrated in FIG. 5, the peripheral wall panel 60 has a substantially strip shape whose outer shape is substantially bilaterally symmetric in the left-right direction. An attachment side portion 61 constituting a region of the peripheral edge of the inflow opening 30 is provided on one end side of the peripheral wall panel 60. The peripheral wall panel 63 mainly constitutes the lower wall portion 25. As illustrated in FIG. 5, the peripheral wall panel 63 has a substantially strip shape whose outer shape is substantially bilaterally symmetric. An attachment side portion 64 constituting a region of the peripheral edge of the inflow opening 30 is provided also on one end side of the peripheral wall panel 63. The side wall panels 68L and 68R respectively constitute the left wall portion 26 and the right wall portion 27 and are a pair of left and right portions whose outer shapes are substantially bilaterally symmetrical.

In the bag main body 21 of the embodiment, the recessed shape of the recessed portion 35 is caused by the outer shapes of the side wall panels 68L and 68R constituting the left wall portion 26 and the right wall portion 27. In detail, the recessed shape of the recessed portion 35 is caused by the shapes of curved portions 70L and 70R constituting parts of outer edges 69L and 69R of the side wall panels 68L and 68R. In the embodiment, as described later, when the outer edges 69L and 69R of the side wall panels 68L and 68R are attached, by sewing, to edge portions 60c, 60d, 63c, and 63d of the corresponding peripheral wall panels 60 and 63, the bag main body 21 having the recessed portion 35 can be shaped.

Figure 6:
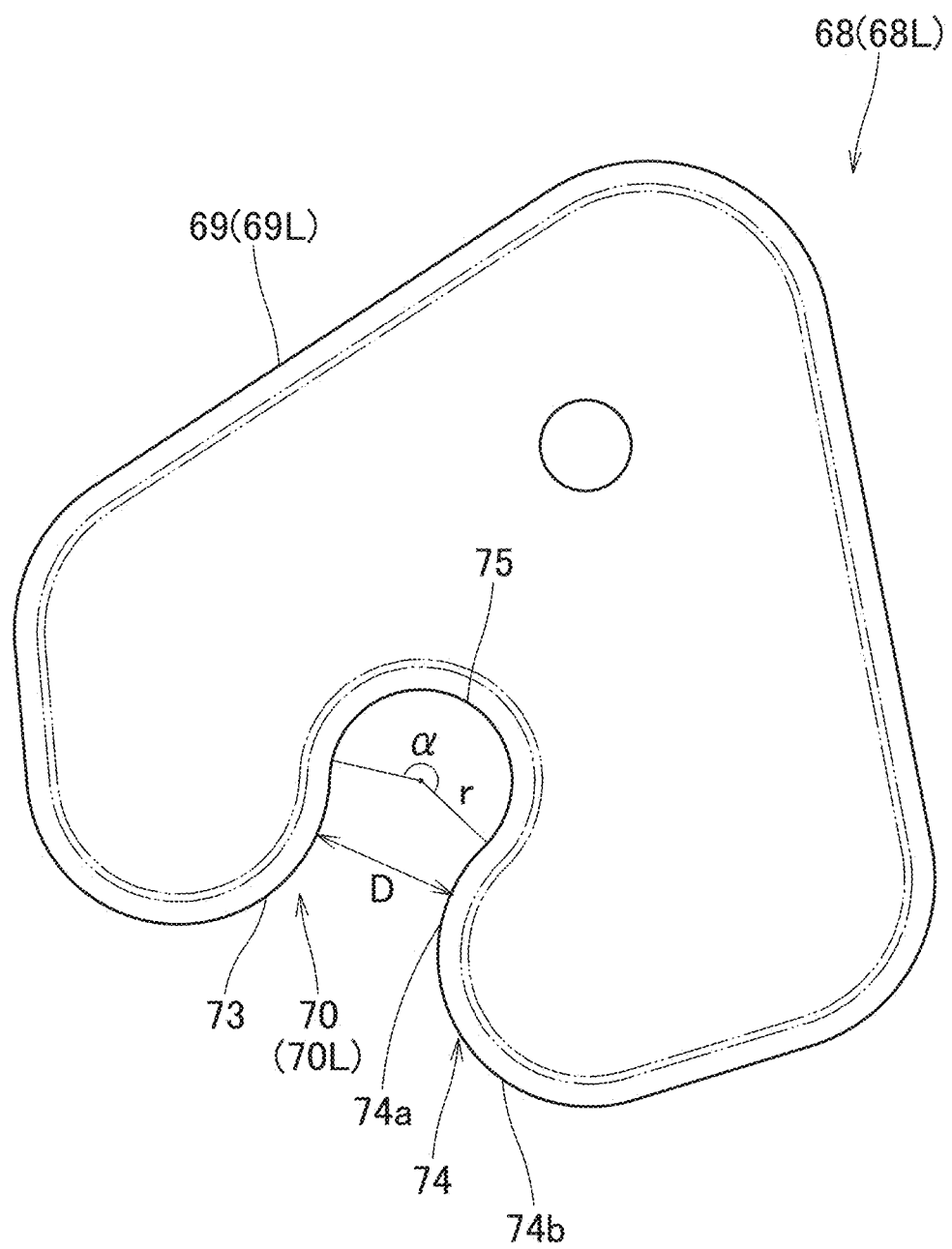
FIG. 6 is an enlarged plan view of a side wall panel constituting the airbag in FIG. 3.

A detailed description will be given below taking, as an example, the side wall panel 68L constituting the left wall portion 26. On a front lower end side region of the outer edge 69L (69) of the side wall panel 68L (68) constituting the left wall portion 26, there is formed a curved portion 70L (70) such that three arcs are connected (see FIG. 6). A front-side arc portion 73 and a rear-side arc portion 74 respectively disposed on the front side and the rear side are formed in a substantially arc shape protruding outward (downward or forward). The center-side arc portion 75 disposed in the middle is configured to have a substantially arc shape protruding inward and to connect the front-side arc portion 73 and the rear-side arc portion 74. In the side wall panel 68, the region of the peripheral edge of the front-side arc portion 73 constitutes a region in the vicinity of the front lower end of the left wall portion 26 and beside the inflow opening 30. In the side wall panel 68, a rear side portion 74b side region of the rear-side arc portion 74 constitutes a region in the vicinity of the rear lower end of the left wall portion 26 and in the vicinity of the lower end 40a of the occupant side wall portion 40. Furthermore, in the side wall panel 68, a region of a peripheral edge of the center-side arc portion 75 and a region of a peripheral edge of a front-side portion 74a of the rear-side arc portion 74 constitutes a region near a left edge of the recessed portion 35 in the left wall portion 26. In the case of the embodiment, in a state where the side wall panel 68 is developed flat, the center angle α of the center-side arc portion 75 is set to about 230° (see FIG. 6). In more detail, in the case of the embodiment, a radius dimension r of the center-side arc portion 75 is set to about 80 mm (see FIG. 6). Furthermore, a separation distance D (see FIG. 6) at a position where the front-side arc portion 73 and the rear-side arc portion 74 are closest to each other is set to about 125 mm, which is larger than the radius dimension r of the center-side arc portion 75. The front-side arc portion 73 and the rear-side arc portion 74 are both set to have a radius dimension larger than the radius dimension of the center-side arc portion 75. In the bag main body 21 of the embodiment, specifically, in the curved portion 70, an outer shape formed by the center-side arc portion 75 and by a front side region of the rear-side arc portion 74 (the region is the front-side portion 74a), which continues from the center-side arc portion 75, defines an outer shape of the recessed portion 35 when the inflation is completed (a recessed shape of the gap formed between the completely inflated bag main body 21 and the instrument panel 1).

In the embodiment, the following are each formed of a flexible woven fabric made of a polyester yarn, a polyamide yarn, or the like: the peripheral wall panels 60 and 63 and the side wall panels 68L and 68R constituting the bag main body 21; the front-side portion material 49 and the rear-side portion 47 constituting the front-rear tether 45; and the tether base materials 57 and 57 constituting the outer tether portion 55.

Next, a description will be given to how to manufacture the airbag 20 of the embodiment. One end side of each of the tether base materials 57 and 57 constituting the outer tether portion 55 is sewn to the outer surface side of the peripheral wall panel 63. The rear-side portion 47 constituting the front-rear tether 45 is sewn to an inner surface side, of the peripheral wall panel 60, in a region constituting the occupant side wall portion 40. First, the attachment side portions 61 and 64 formed on the peripheral wall panels 60 and 63 are stacked on each other, and an edge portion 60a of the peripheral wall panel 60 is sewn to the peripheral wall panel 63. In a similar manner, an edge portion 63a of the peripheral wall panel 63 is sewn to the peripheral wall panel 60. Next, the front-side portion material 49 constituting the front-rear tether 45 is stacked on the attachment side portions 61 and 64, and the attachment side portions 61 and 64 and the front-side portion material 49 are sewn to each other at a portion to be the peripheral edge of the inflow opening 30. Next, the inflow opening 30 and the attachment holes 31 are opened at the portions of the attachment side portions 61 and 64. Thereafter, corresponding edge portions 60b and 63b of the peripheral wall panels 60 and 63 are sewn to each other using a sewing thread. Next, the outer edge 69L of the side wall panel 68L and the edge portions 60c and 63c of the peripheral wall panels 60 and 63 are sewn to each other. In a similar manner, an outer edge 69R of the side wall panel 68R and the edge portions 60d and 63d of the peripheral wall panels 60 and 63 are sewn to each other, thereby forming the bag main body 21, which has a bag shape. The bag main body 21 is turned over using the inflow opening 30. Thereafter, the front-side portion 46 and the rear-side portion 47 are pulled out through the inflow opening 30, and the front-rear tether 45 is formed by sewing its end portions to each other. When the end portions of the tether base materials 57 and 57 are sewn to each other to form the outer tether portion 55, the airbag 20 can be manufactured.

Figure 7A:
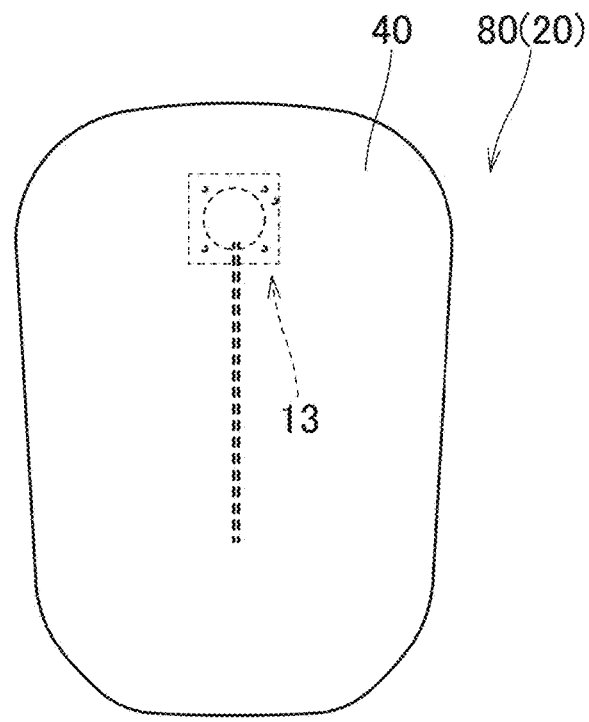
FIG. 7A is a plan view of a preliminarily folded bag formed by folding the airbag in FIG. 3.
Figure 7B:
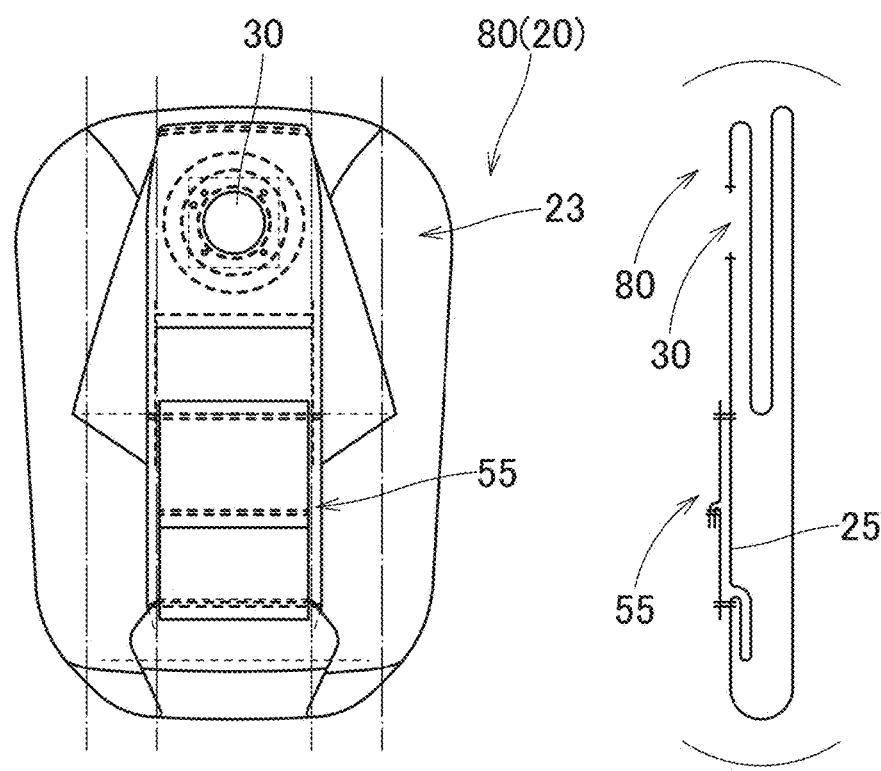
FIG. 7B is a bottom view of the preliminarily folded bag.
Figure 8A:
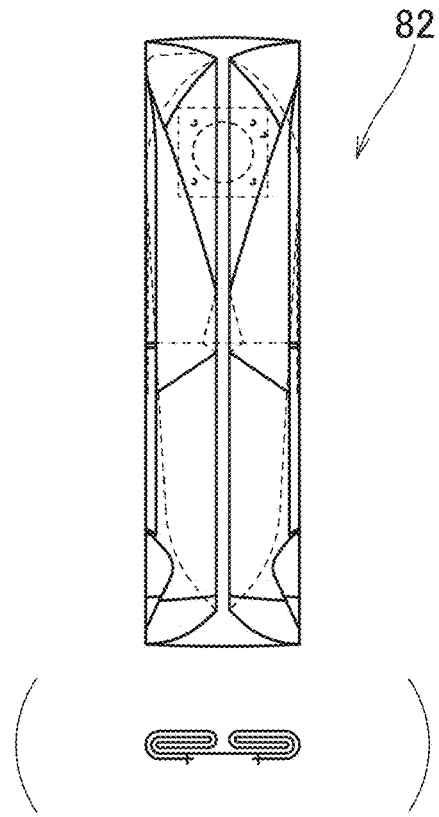
FIG. 8A is a plan view of a left-right contracted bag formed by folding the preliminarily folded bag.
Figure 8B:
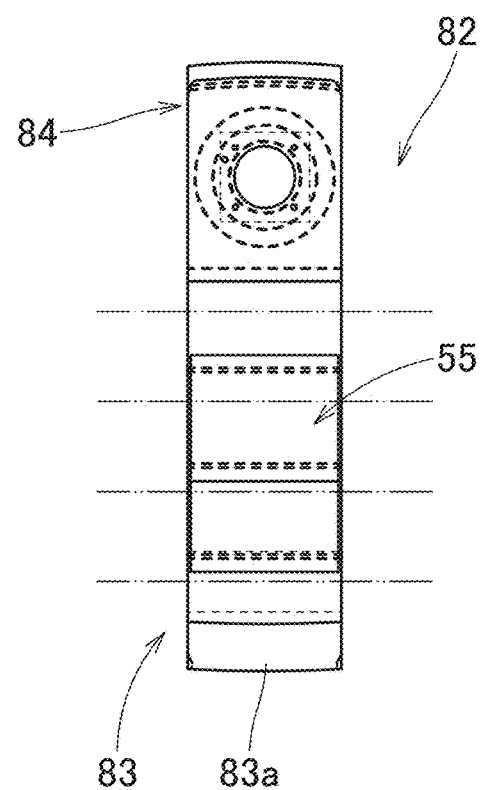
FIG. 8B is a bottom view of the left-right contracted bag.
Figure 9A:
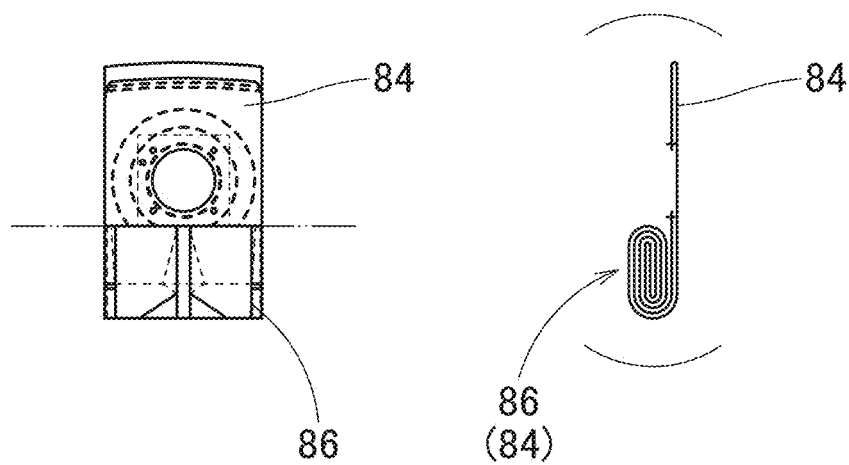
FIGS. 9A to 9C are schematic views illustrating a folding step of the airbag in FIG. 3, and illustrate a front-rear contraction step (step subsequent to FIGS. 8A and 8B)
Figure 9B:
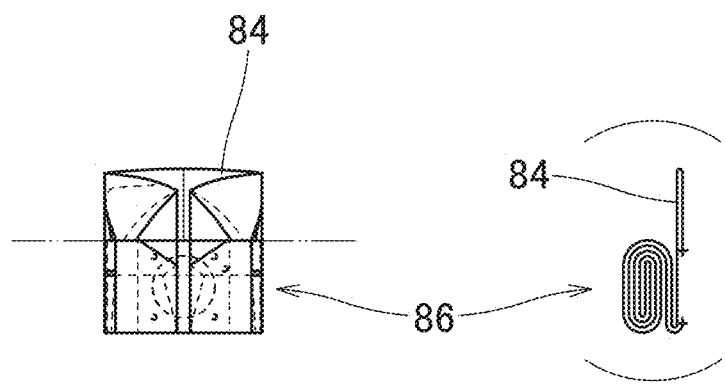
Figure 9C:
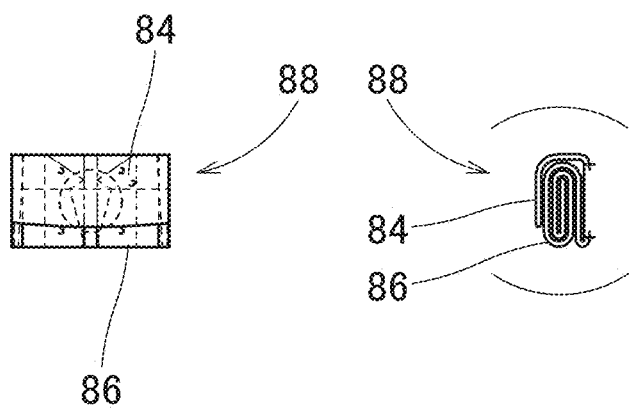

Next, a description will be given to how to mount the airbag device M on the vehicle V. First, the airbag 20 in which the retainer 13 is stored is folded to be storable in the case 16 such that the bolts 13a protrude from the attachment holes 31. In the embodiment, as illustrated in FIGS. 7A to 9C, the airbag 20 is folded through the following steps: a left-right contraction step in which the width dimension in the left-right direction can be reduced from the state of a preliminarily folded bag 80, which is preliminarily folded; and a front-rear contraction step in which the width dimension in the front-rear direction can be reduced. Then, the airbag 20 is stored in the case 16 in the state of a completely folded body 88, which is folded. Specifically, first, the occupant side wall portion 40 is unfolded substantially flat, and, at the same time, the occupant side wall portion 40 is brought close to an inflow opening 30 side, and the peripheral side wall portion 23 is folded in such a manner that valley folds are formed in the region of the peripheral wall portion 23, so that the preliminarily folded bag 80 is formed as illustrated in FIGS. 7A and 7B. In the preliminarily folded bag 80, the lower wall portion 25 is partially folded in such a manner that a valley fold is formed, and the outer tether portion 55 is disposed on the lower wall portion 25 in a state of being unfolded flat (see FIG. 7B). Next, in the preliminarily folded bag 80, a left edge side and a right edge side of the inflow opening 30 are folded by roll folding so as to be rolled toward the occupant side wall portion 40, so that a left-right contracted bag 82 as illustrated in FIGS. 8A and 8B is formed. Thereafter, front-rear contraction folding is performed. Specifically, a rear side portion 83 that is on the rear side with respect to the inflow opening 30 in the left-right contracted bag 82 is roll-folded such that a rear edge 83a is rolled toward a peripheral wall portion 23 side, so that a roll-folded portion 86 is formed (see FIG. 9A). The roll-folded portion 86 is turned over to be placed on the inflow opening 30 (see FIG. 9B). Thereafter, in the left-right contracted bag 82, when a front-side portion 84 that is on the front side with reference to the inflow opening 30 is folded so as to be placed on the upper side of the roll-folded portion 86, it is possible to form the completely folded body 88 that can be stored in the case 16, as illustrated in FIG. 9C.

The airbag 20 (completely folded body 88) folded in this manner is wrapped around with a breakable wrapping sheet (reference sign not shown) so as to keep the folded shape. Thereafter, the completely folded body 88 is stored in the case 16 such that the bolts 13a protrude from the bottom wall portion 16a. Then, a main body portion 12a of the inflator 12 is inserted into the case 16 from below the bottom wall portion 16a. At this time, the bolts 13a of the retainer 13 protruding downward from the bottom wall portion 16a are inserted into the flange portion 12c of the inflator 12. When the nuts 14 are fastened to the bolts 13a protruding from the flange portion 12c, the folded airbag 20 and the inflator 12 can be attached to the case 16. Thereafter, the peripheral wall portion 16b of the case 16 is locked to the connecting wall portion 10c of the airbag cover 10 of the instrument panel 1 mounted on the vehicle V. A bracket (not illustrated) provided on the case 16 is fixed to the body side of the vehicle V. When the inflator 12 is electrically connected to a control device (not illustrated), the airbag device M can be mounted on the vehicle V.

After the airbag device M is mounted on the vehicle V, when inflation gas is discharged from the gas discharge ports 12b of the inflator 12, the airbag 20 is inflated by allowing the inflation gas to flow into the inside of the airbag 20, thereby pushing and opening the door portions 10a and 10b of the airbag cover 10. The airbag 20 protrudes upward from the case 16 through the opening of the case 16 formed by opening the door portions 10a and 10b of the airbag cover 10 and, at the same time, is unfolded and inflated while protruding toward the rear side of the vehicle. Then, as illustrated in FIG. 12, the airbag 20 is completely inflated so as to block the space between the upper surface 2 of the instrument panel 1 and the windshield 7 above the instrument panel 1.

In the airbag device M of the embodiment, when the airbag 20 is completely inflated, the inflated bag main body 21 is disposed in a region on the front lower surface side such that a gap is provided between the airbag 20 and the instrument panel 1. However, the rear lower end 21c side of the bag main body 21 is connected, via the outer tether portion 55 disposed on the outer peripheral surface side of the bag main body 21, to the front edge 35a side of the recessed portion 35, which forms the gap; therefore, the rear lower end 21c side is disposed close to the rear surface 3 of the instrument panel 1 when the inflation is completed. That is, in the airbag device M of the embodiment, the airbag 20 (bag main body 21) can be inflated in a state where the airbag 20 is partially recessed so that a gap can be provided between the airbag 20 and the instrument panel 1. Therefore, the volume can be reduced as compared with an airbag having a configuration not including such a recessed portion. The rear lower end 21c side of the inflated bag main body 21 is disposed close to the rear surface 3 of the instrument panel 1 by the outer tether portion 55. Furthermore, the recessed portion 35 formed in the bag main body 21 is formed in a region on the front side with reference to the occupant side wall portion 40 that protects the occupant when the inflation is completed. Therefore, although the recessed portion 35 is included, a rear lower end 21c side region of the bag main body 21 can be supported by the instrument panel 1, and the occupant moving forward can be stably received by the occupant side wall portion 40. As a result, in the airbag device M of the embodiment, even when there is a difference in the shape of the interior structure of the vehicle to which the airbag device M is mounted, an increase in the volume of the airbag 20 can be suppressed by appropriately setting the shape of the recessed portion 35 formed in the bag main body 21, and an increase in the size of the device itself can also be suppressed.

Therefore, the airbag device M of the embodiment can be configured to be compact and can adequately protect the occupant.

Figure 10A:
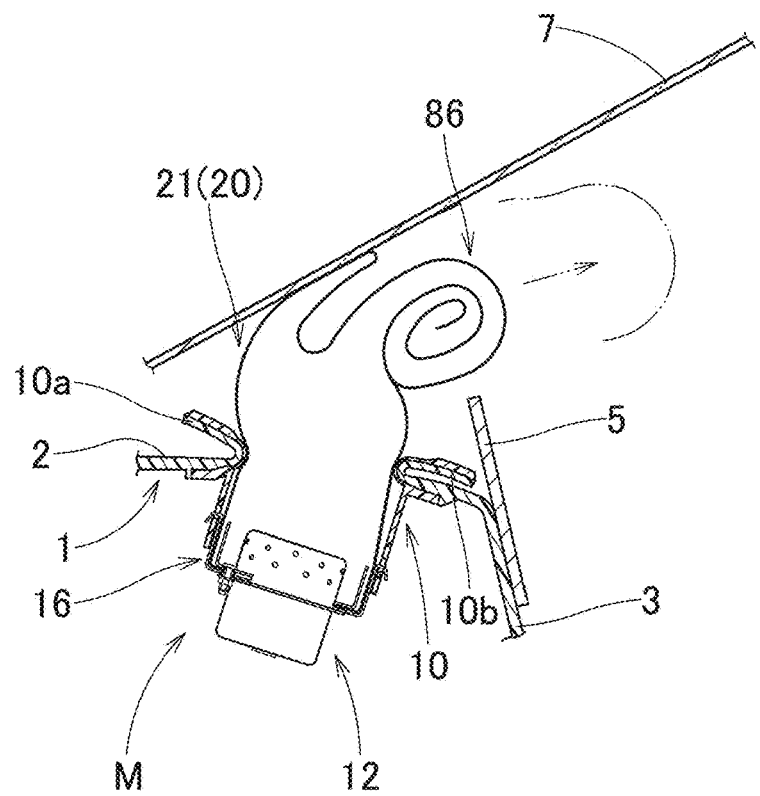
FIGS. 10A and 10B are schematic vertical sectional views illustrating an inflation process of the airbag in the airbag device for a passenger seat of the embodiment.
Figure 10B:
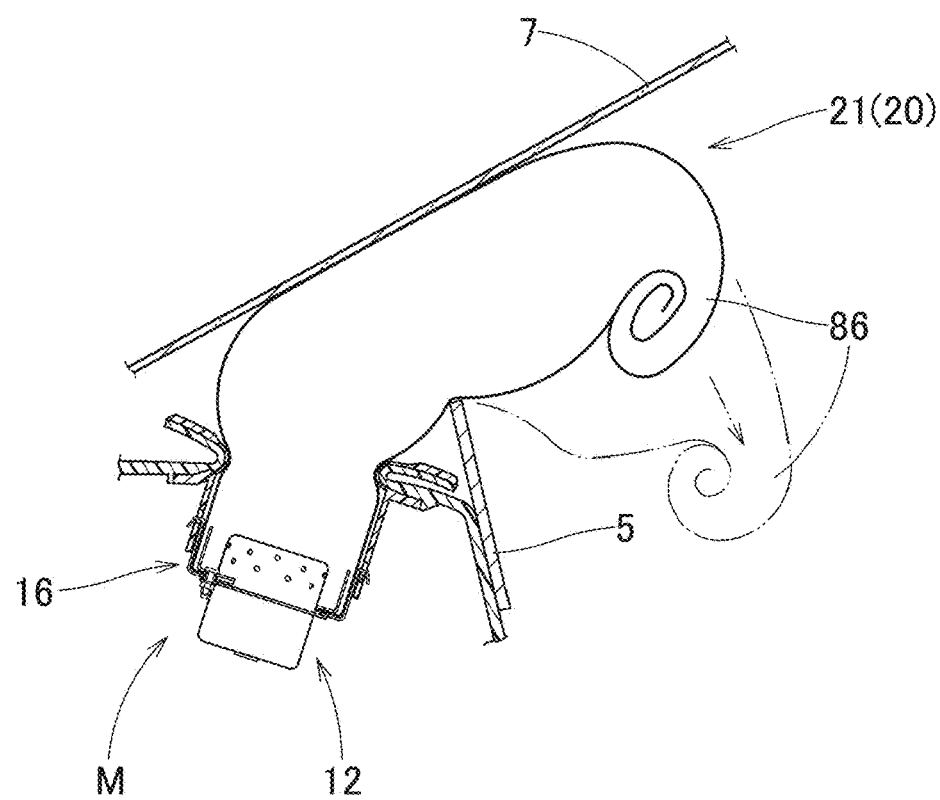
Figure 11A:
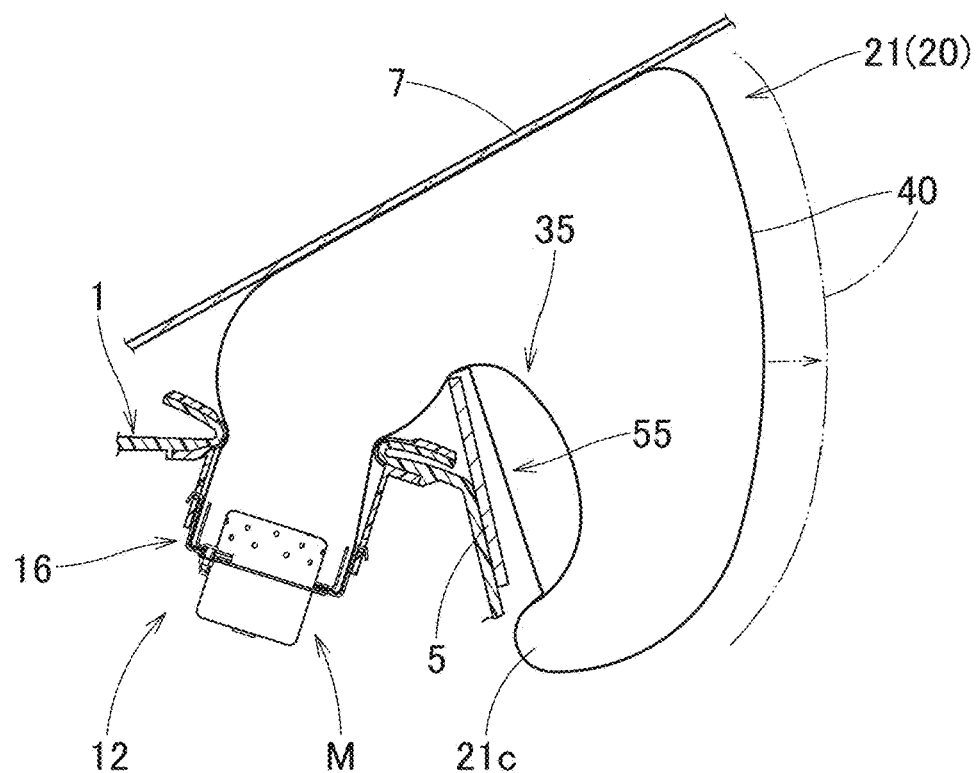
FIGS. 11A and 11B are schematic vertical sectional views illustrating the inflation process of the airbag in the airbag device for a passenger seat of the embodiment, and illustrate the process that is subsequent to FIG. 10B.
Figure 11B:
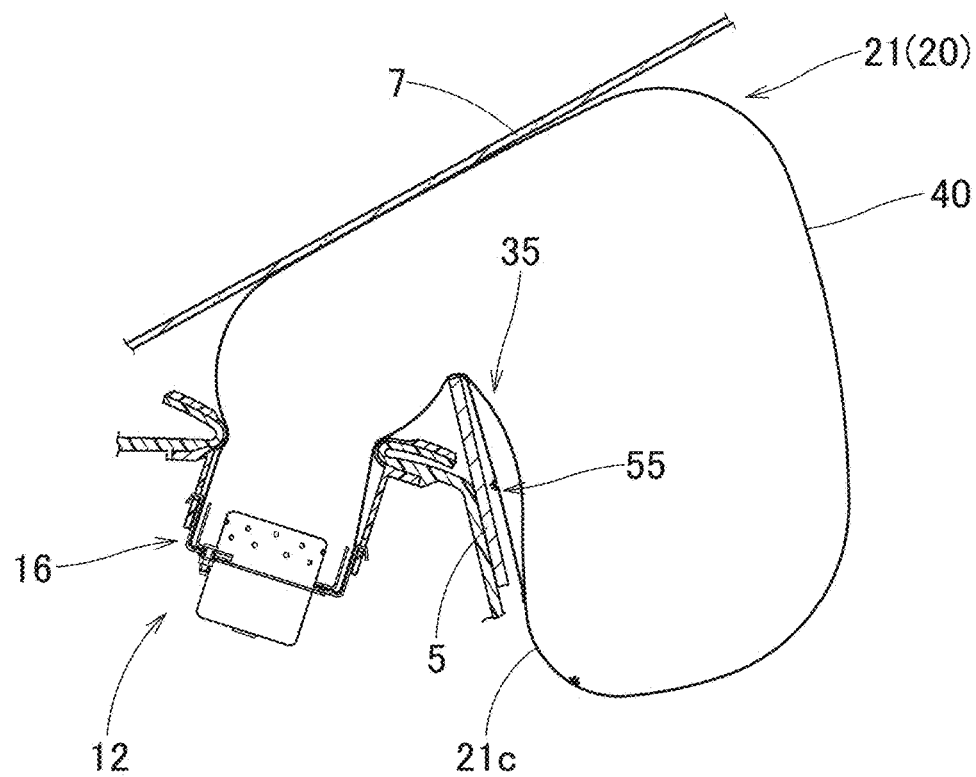

Furthermore, the airbag device M of the embodiment is mounted on the vehicle V in which the monitor 5 as a protruding portion is disposed so as to partially protrude upward from the instrument panel 1, and the monitor 5 is disposed behind a region where the airbag device M is mounted. However, the bag main body 21 is configured to be inflatable so that the monitor 5 partially protruding upward from the instrument panel 1 is positioned in the recessed portion 35. Therefore, even when the airbag device M is configured to be mounted on such a vehicle V, it is possible to suppress great interference of the inflating bag main body 21 with the monitor 5 as a protruding object, and it is possible to smoothly complete the inflation. A detailed description will be given below to how the airbag 20 (bag main body 21) in the airbag device M of the embodiment behaves when being unfolded. When the bag main body 21 is inflated while allowing inflation gas to flow into the inside of the bag main body 21, the bag main body 21 first protrudes upward from the case 16, and is unfolded so as to release the folded state while causing the roll-folded portion 86 to protrude rearward. As illustrated in FIGS. 10A and 10B, the roll-folded portion 86 protrudes rearward so as to climb over the monitor 5, and is then vertically unfolded widely so as to release the folding state. At this time, the bag main body 21 is inflated so as to detour around the monitor 5 by the recessed portion 35 (so as to allow the monitor 5 to enter the recessed portion 35) and to vertically develop the occupant side wall portion 40 widely at a position behind the monitor 5 (see FIG. 11A). Further, the lower end 40a side of the occupant side wall portion 40 (the rear lower end 21c side of the bag main body 21 when completely inflated) is connected to a front edge 35a side region of the recessed portion 35 (a portion positioned near the upper end 5b of the monitor 5) by the outer tether portion 55. Therefore, the occupant side wall portion 40 is prevented from excessively protruding rearward and downward. That is, when being unfolded and inflated, the bag main body 21 is prevented from largely protruding rearward and downward by the outer tether portion 55. As a result, the bag main body 21 is inflated while being restricted from greatly swinging in the up-down direction. Then, the occupant side wall portion 40 is unfolded rearward while being prevented from swinging in the up-down direction and keeping a state of being vertically developed widely (see FIGS. 11A and 11B). Therefore, the bag main body 21 is inflated while being prevented from largely swinging in the up-down direction, and the rear of the monitor 5 can therefore be quickly covered by the occupant side wall portion 40. When the bag main body 21 is completely inflated, the outer tether portion 55 is disposed close to the rear surface 5a side of the monitor 5 as illustrated in FIG. 12. Therefore, when the occupant MP is received by the occupant side wall portion 40, the outer tether portion 55 is supported by the monitor 5, so that a reaction force can be secured, and the occupant MP can be adequately protected.

As described above, in the airbag device M of the embodiment, the outer shape of the recessed portion 35 of the bag main body 21 is defined by the shapes of the curved portions 70 (70L, 70R) provided on the side wall panels 68 (68L, 68R). In the embodiment, the curved portions 70 are each provided so as to connect the three arcs in a state where the side wall panels 68 are developed flat. In each curved portion 70, the center-side arc portion 75 disposed in the middle constitutes the most recessed region of the recessed portion 35, and the center-side arc portion 75 has a substantially arc shape in which the radius dimension r is set to about 80 mm and the center angle α is set to about 230°. That is, the center-side arc portion 75 has a shape that is gently curved and largely recessed. A region from the center-side arc portion 75 to the front side region of the rear-side arc portion 74 (front-side portion 74a) is continuously curved in an S shape. Furthermore, in each curved portion 70, the separation distance D at a position where the front-side arc portion 73 and the rear-side arc portion 74 are closest to each other is set to about 125 mm, which is larger than the radius dimension r of the center-side arc portion 75.

That is, the recessed portion 35 defined by the outer shape of the curved portion 70 of each side wall panel 68 is formed such that the lower end side is opened widely in the front-rear direction and is largely recessed upward keeping to be wide in the front-rear direction when the bag main body 21 is completely inflated. Therefore, if a configuration in which h an outer tether portion is not provided on a bag main body is employed, the bag main body is unfolded so as to detour around the monitor by the recessed portion, but a portion disposed behind the recessed portion in the bag main body (a lower end side region of the occupant side wall portion) largely protrudes rearward. This is because the recessed portion is formed such that the lower end side (the lower surface side of the bag main body) is opened widely in the front-rear direction. Incidentally, in the case where the outer tether portion is not provided, the bag main body is unfolded in the following manner. A curved region having a substantial S-shape is formed from the rear side of the center-side arc portion to the front side of the rear-side arc portion and constitutes the peripheral edge of the recessed portion, and the bag main body is unfolded such that the S-shape is stretched. In the case where the outer tether portion is not provided, the bag main body is unfolded such that the rear lower end side of the bag main body, in other words, the lower end side region of the occupant side wall portion is made to protrude largely rearward and downward. In the airbag device M of the embodiment, since the outer tether portion 55 is provided on the bag main body 21, even when the bag main body 21 is configured to include the recessed portion 35 that is opened widely in the front-rear direction and is largely recessed (deeply recessed) upward, it is possible to adequately prevent the rear lower end 21c side region of the bag main body 21 (the lower end 40a side region of the occupant side wall portion 40) from largely protruding rearward and downward when the bag main body 21 is unfolded and inflated.

In the airbag device M of the embodiment, the outer tether portion 55 that restricts the completely inflated shape of the bag main body 21 is set to have the length dimension L1 substantially equal to the length dimension L2 of the straight line connecting between the points P1 and P2 corresponding to the connection target portions 77F and 77B to which both ends of the outer tether portion 55 are respectively connected in the state where the side wall panel 68 is developed flat. That is, in the embodiment, the outer tether portion 55 can restrict the behavior (excessive protrusion in the rearward and downward direction) of the rear lower end 21c side region of the bag main body 21 in the middle of being inflated, but is not configured to excessively pull the rear lower end 21c side region of the bag main body 21 forward when the airbag 20 is completely inflated. Therefore, it is possible to suppress deformation of the bag main body 21 by being excessively pulled by the outer tether portion 55 when the inflation is completed, and the occupant can therefore be stably protected by the completely inflated bag main body 21.

Incidentally, the recessed portion does not need to be configured with such a curved portion. For example, instead of the curved portion, a bent portion that is bent at an acute angle may be provided at a similar position in each side wall panel to form the recessed portion. However, in consideration of a manufacturing cost of the bag main body (easiness and rapidity of sewing work between the side wall panels and the peripheral wall panel), it is desirable to provide a curved portion that is gently curved as in the embodiment rather than a bent portion that is bent at an acute angle. That is, in the airbag used in the airbag device of the embodiment, the sewing work of the bag main body is easy, it is therefore possible to suppress an increase in manufacturing man-hours and manufacturing cost, and in addition, even when the airbag is mounted on a vehicle provided with a monitor partially protruding between the occupant and the airbag, it is possible to adequately protect the occupant when the airbag is completely inflated.

Note that, in the airbag 20 of the embodiment, there is provided a single outer tether portion 55 having a wide strip shape whose width dimension is substantially the same as the width dimension of the lower wall portion 25 of the bag main body 21. The outer shape of the outer tether portion and the number of the outer tethers disposed are not limited to those in the embodiment. For example, as the outer tether portion, a plurality of narrow strip-shaped members or strap-shaped members may be provided parallelly in the left-right direction.

In the embodiment, the airbag device for a passenger seat disposed in front of a passenger seat has been described as an example, but the present disclosure is not limited to the airbag device for a passenger seat. For example, the present disclosure may be applied to an airbag device for a driver seat of a type including an airbag that is mounted at a position, on an instrument panel, in front of a steering wheel and that is inflated so as to cover a rear surface of the steering wheel. When the present disclosure is applied to the airbag device for a driver seat having such configuration, even when the steering wheel is disposed so as to partially protrude upward from the instrument panel, the completely inflated airbag can smoothly cover the rear surface side of the steering wheel as a protruding object and adequately protect the driver.

The present disclosure relates to an airbag device having the following configuration.

An airbag device is disposed on an upper surface side of an instrument panel, and the airbag device includes:
  an airbag configured to inflate by allowing inflation gas to flow into the airbag;
  an inflator that supplies the inflation gas to the airbag; and
  a storage portion that stores the airbag that is folded and the inflator,
  the airbag being configured to be unfolded and inflated rearward while protruding upward from the storage portion when the airbag inflates by allowing the inflation gas discharged from the inflator to flow into the airbag,
  wherein
  the airbag includes:
    a bag main body that inflates by allowing the inflation gas to flow into the bag main body; and
    an outer tether portion that is disposed on an outer peripheral surface side of the bag main body and regulates a completely inflated shape of the bag main body, and
  the bag main body includes:
    an occupant side wall portion that is provided on a rear surface side of the bag main body when the bag main body is completely inflated and that is configured to protect an occupant seated on a front seat; and
    a recessed portion that is recessed upward so as to provide a gap between the bag main body and the instrument panel, on a lower surface side of a region on a front side with respect to the occupant side wall portion when the bag main body is completely inflated, and
  the outer tether portion is provided so as to connect a rear lower end side of the bag main body and a front edge side of the recessed portion when the bag main body is completely inflated, such that a rear lower end of the bag main body when the bag main body is completely inflated is disposed close to a rear surface of the instrumentation panel.

The airbag device of the present disclosure is disposed such that, when the airbag is completely inflated, the inflated bag main body is disposed to provide a gap between the inflated bag main body and the instrument panel in a region on the front lower surface side. However, the rear lower end side of the bag main body is connected, via the outer tether portion disposed on the outer peripheral surface side of the bag main body, to the front edge side of the recessed portion, which forms the gap; therefore, the rear lower end side of the bag main body is disposed close to the rear surface of the instrument panel when the inflation is completed. That is, in the airbag device of the present disclosure, the airbag (bag main body) can be inflated to be partially recessed so that a gap is provided between the airbag and the instrument panel. Therefore, the volume can be reduced as compared with an airbag having a configuration not including such a recessed portion. The rear lower end side of the inflated bag main body is disposed close to the rear surface of the instrumentation panel by the outer tether portion. Furthermore, the recessed portion formed in the bag main body is formed in a region on the front side with reference to the occupant side wall portion that protects the occupant when the inflation is completed. Therefore, although the recessed portion is included, a rear lower end side region of the bag main body can be supported by the instrument panel, and the occupant moving forward can be stably received by the occupant side wall portion. As a result, in the airbag device of the present disclosure, even when there is a difference in the shape of the interior structure of the vehicle to which the airbag device is mounted, an increase in the volume of the airbag can be suppressed by appropriately setting the shape of the recessed portion formed in the bag main body, and an increase in the size of the device itself can also be suppressed.

Therefore, the airbag device of the present disclosure can be configured to be compact and can adequately protect the occupant.

Further, preferably, in the airbag device of the present disclosure, the bag main body is configured to be inflated such that a protruding object disposed to partially protrude upward from the instrument panel is positioned in the recessed portion, and the outer tether portion is configured to be disposed close to the rear surface side of the protruding object when the bag main body is completely inflated.

In the airbag device configured as described above, even in the case where the airbag device is mounted on a vehicle of a type in which the protruding object partially protrudes from the instrument panel, when the recessed portion is provided, it is possible to suppress great interference of the bag main body that is being inflated with the protruding object and to smoothly complete the inflation. Furthermore, in the airbag device configured as described above, the outer tether portion is disposed close to the rear surface side of the protruding object when the bag main body is completely inflated. Therefore, when the occupant is received by the occupant side wall portion, the outer tether portion is supported by the protruding object, so that a reaction force can be secured, and the occupant can be adequately protected.

What is claimed is:

1. An airbag device disposed on an upper surface side of an instrument panel, the airbag device comprising:
  an airbag configured to inflate by allowing inflation gas to flow into the airbag;

an inflator that supplies the inflation gas to the airbag; and
a storage portion that stores the airbag that is folded and the inflator,
the airbag being configured to be unfolded and inflated rearward while protruding upward from the storage portion when the airbag inflates by allowing the inflation gas discharged from the inflator to flow into the airbag,
wherein
the airbag includes:
　a bag main body that inflates by allowing the inflation gas to flow into the bag main body; and
　an outer tether portion that is disposed on an outer peripheral surface side of the bag main body and regulates a completely inflated shape of the bag main body, and
the bag main body includes:
　an occupant side wall portion that is provided on a rear surface side of the bag main body when the bag main body is completely inflated and that is configured to protect an occupant seated on a front seat; and
　a recessed portion that is recessed upward so as to provide a gap between the bag main body and the instrument panel, on a lower surface side of a region on a front side with respect to the occupant side wall portion when the bag main body is completely inflated, and
the outer tether portion is provided so as to connect a rear lower end side of the bag main body and a front edge side of the recessed portion when the bag main body is completely inflated, such that a rear lower end of the bag main body when the bag main body is completely inflated is disposed close to a rear surface of the instrument panel,
wherein the bag main body includes:
　a peripheral wall portion that extends from a peripheral edge of the occupant side wall portion, when the bag main body is completely inflated, to block a space between an upper surface of the instrument panel and a windshield above the instrument panel and the peripheral wall portion includes an upper wall portion and a lower wall portion disposed to be opposed to each other in an up-down direction,
the peripheral wall portion includes a left wall portion and a right wall portion disposed so as to be opposed to each other in left-right direction,
the left wall portion and the right wall portion are constituted of a pair of side wall panels that are bilaterally symmetric, and
each of the side wall panels has, on an outer edge of the side wall panel, a curved portion that defines an outer shape of the recessed portion.

2. The airbag device according to claim 1, wherein the bag main body is inflated such that a protruding object disposed to partially protrude from the instrument panel is positioned in the recessed portion, and
　the outer tether portion is disposed close to a rear surface side of the protruding object when the bag main body is completely inflated.

3. The airbag device according to claim 2, wherein the protruding object is a monitor disposed to protrude from the instrument panel.

4. The airbag device according to claim 1, wherein a length dimension of the outer tether portion is set to be equal to a length dimension of a straight line connecting between points corresponding to connection target portions of each of the side wall panels in a state of being unfolded flat, each of the target portions being for one of both ends of the outer tether portion to be connected to the side wall panel.

* * * * *